Patented Sept. 15, 1942

2,295,923

UNITED STATES PATENT OFFICE 2,295,923

ALLYL ESTERS OF ACRYLIC ACID AND HOMOLOGUES

Carl E. Barnes, Worcester, Mass., assignor, by mesne assignments, to E. I. du Pont de Nemours & Company, Wilmington, Del., a corporation of Delaware No Drawing. Application December 6, 1938, Serial No. 244,217

2 Claims. (Cl. 260—84)

This invention relates to polymerizable substances and copolymers formed therefrom, and more particularly to the esters of substituted allyl alcohols and acrylic acid and its homologues.

Various compounds containing an unsaturated methylene group, such as methyl methacrylate, are capable of polymerization by a rearrangement of the primary valence bonds in such a way as to form a linear chain having the group $$-CH_2-C-$$
$$\phantom{-CH_2-}|$$
$$\phantom{-CH_2-}R$$

as a repeating unit (R being hydrogen, methyl, halogen, etc.). These linear polymers ordinarily have the properties of fusibility and solubility and they are thus unsuited for many purposes where hardness and a high softening point are important characteristics. I may copolymerize such substances to form linear polymers with a cross linking agent which contains two polymerizable unsaturated methylene groups per molecule, such as ethylene glycol dimethacrylate. Both of these groups may cross link with the linear polymer chains and thus form a three dimensional structure which is infusible and insoluble.

In accordance with this invention, I propose to make as such cross linking agents alpha substituted allyl esters of acrylic acid and alpha methyl substituted acrylic acid. The primary object of this invention is, therefore, to prepare such alpha substituted allyl esters of acrylic acid and methacrylic acid and to form polymerized bodies thereof.

A further object is to employ such alpha substituted allyl esters of acrylic acid and methacrylic acid as a hardening or cross linking agent for modifying various polymerizable compounds having but a single unsaturated methylene group.

Another object is to make synthetic resins of such copolymers and to employ the monomeric or polymeric substances in the production of shaped or molded bodies and for use as a bond for granular material, such as abrasive grains. Further objects will be apparent in the following disclosure.

I, therefore, propose to make and to use as a polymerized substance, an alpha substituted allyl ester of acrylic acid and its homologues of the general formula:

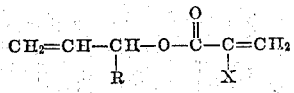

wherein X may be hydrogen, methyl, or a halogen, and wherein R may be an alkyl, alicyclic or aryl group, such as methyl, ethyl, propyl, butyl, allyl, cyclohexyl, phenyl, tolyl and other similar groups.

These substances may be prepared by the addition of the corresponding Grignard reagent to acrolein, followed by esterification of the resulting secondary alcohol with acrylic or alpha methyl or halogen substituted acrylic acid. The nature of the Grignard reagent determines the alpha substituent of the allyl group, hence a great many derivatives may be made. The esterification of the secondary alcohol obtained may be carried out by different methods, but I prefer to employ acrylic or methacrylic anhydride as the esterification reagent. The steps are indicated by the following reactions where R is an alkyl, alicyclic or aryl group, R' is hydrogen, halogen or methyl and X is any halogen, such as chlorine, bromine or iodine:

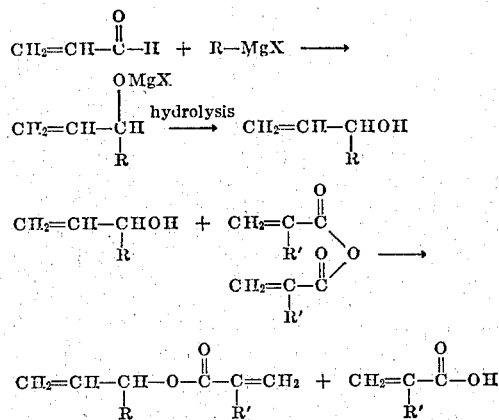

It is desirable to use a polymerization inhibitor, such as pyrogallol or copper methacrylate, during the esterification reaction, and it is desirable to use a base, such as pyridine to combine with the free acid liberated during the course of the esterification. These substances are removed by washing the product in water and/or by the subsequent distilling operation to separate and purify the product.

These alpha substituted allyl esters of acrylic acid and its homologues are substantially transparent liquids and they polymerize to transparent solids which are infusible and insoluble.

In addition to the fact that these alpha substituted allyl esters of acrylic acid and its homologues polymerize by themselves to form useful substances, they are also particularly effective as agents for modifying the properties of other polymerizable substances when copolymerized therewith. These esters serve as cross linking agents for various base substances which contain a single polymerizable unsaturated methylene group per molecule, and particularly with those found in the following groups:

1. Derivatives of acrylic acid and methacrylic acid, such as their esters, amides and halides.
2. Vinyl esters.
3. Polymerizable substituted ethylenes.
4. Mono-vinyl and alpha substituted vinyl ketones.
5. Mono-vinyl ethers.
6. Mono-vinyl and alpha substituted vinyl aldehydes.

While many other base substances may be used within the scope of my invention, the following are given as examples of those substances in the above groups with which the alpha substituted allyl esters herein described may be copolymerized.

1. The esters of acrylic acid and its homologues comprise methyl, ethyl, isopropyl and tertiary butyl acrylates and methacrylates as well as other alkyl esters of these acids. They also comprise aryl esters, such as phenyl or benzyl acrylate or methacrylate or paracyclohexylphenyl acrylate or methacrylate. Acryl and methacryl amides and chlorides may also be used.
2. The vinyl esters comprise vinyl acetate, propionate, butyrate, etc.
3. The preferred substituted ethylenes are styrene, furyl ethylene, vinyl chloride and nitroethylene.
4. The preferred mono-vinyl and alpha substituted vinyl ketones comprise methyl vinyl ketone and isopropenyl methyl ketone.
5. The mono-vinyl ethers comprise methyl vinyl ether, phenyl vinyl ether and similar substances.
6. Examples of the mono-vinyl and alpha substituted vinyl aldehydes are acrolein and alpha methyl acrolein.

The chosen alpha substituted allyl ester and the base substance may be so proportioned as to form a substantially infusible and insoluble body, or the proportions may be so selected that there is relatively little cross linking and the product will then have properties intermediate between that of the linear polymer and that of the highly cross-linked interpolymer. Similarly, the ingredients may be so proportioned as to prevent there being sufficient strain set up within the interpolymer to cause crazing or cracking and yet provide enough cross linking to produce a material of sufficiently high softening point or hardness characteristics that it may be shaped by a grinding operation, or may be otherwise serviceable in a given art, such as for making an optical body having increased scratch resistance, or a bonded abrasive article.

These interpolymers are formed by mixing the base substance and the modifying agent in any proportion in which the materials are fully miscible or are soluble in one another, so that the interpolymers are homogeneous, one phase substances. The proportions used determine the properties of the product. If, for example, the alpha methyl substituted allyl ester of methacrylic acid is copolymerized with methyl methacrylate, one obtains an interpolymer in which the softening point or the degree of fusibility and the solubility are dependent upon the proportions of the monomers used. A very small amount of the modifying agent, such as 0.5% will give a body harder than polymeric methyl methacrylate yet one which is moldable under pressure at a temperature higher than that at which methyl methacrylate alone may be molded. Thus such an interpolymer is useful where moldability is required. The proportions of the modifying agent may be increased with a resultant increase in the hardness characteristics of the product. By using a large amount of the alpha substituted allyl esters of acrylic and alpha substituted acrylic acids one may obtain a body which is very hard and has desirable characteristics for use in the optical field. This interpolymer of methyl or ethyl methacrylate or methyl or ethyl acrylate with these various alpha substituted allyl esters of acrylic or alpha substituted acrylic acids are transparent and are therefore useful as optical bodies. The index of refraction may be modified, if desired, by the addition of a third modifying agent. One may use styrene, for example, which has the high index of refraction of 1.5916. Other high index agents are the acrylic and methacrylic acid esters of the hydroxyquinolines, the hydroxydiphenyls, the nitrophenols and the chlorophenols. Other suitable agents are nitroethylene, triphenylmethyl acrylate or methacrylate, and ortho-, meta-, or para-nitrostyrene. Vinyl chloride and acetate have low indices and are useful. The index of refraction of such a triple interpolymer is proportional to the amount of the index modifying agent used and will range between the end values of the substances employed.

A feature of this invention is that I may make such alpha substituted allyl esters of acrylic or alpha substituted acrylic acid which not only serve as cross linking agents by virtue of their two polymerizable unsaturated groups per molecule, but also contain as the substituent a group which raises the refractive index. Thus, I may use such compounds as alpha triphenylmethyl allyl methacrylate,

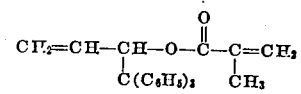

alpha triphenylphenyl allyl methacrylate,

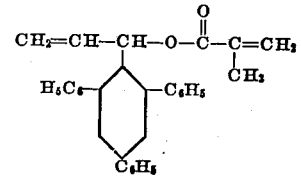

and alpha diphenyl allyl methacrylate,

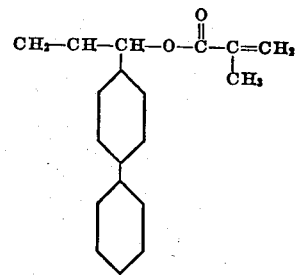

These compounds then serve not only as cross linking agents, but also as refractive index modifying agents. For example, polymerized alpha triphenylmethyl allyl methacrylate has a refractive index of 1.65 and may be used to raise the refractive index of poly methyl methacrylate from its value of 1.49 as well as to harden this substance by cross linking. Hence, I may make a large range of optical bodies of the required indices of refraction and dispersion values which have not been heretofore available.

I may make various combinations of these base substances and modifying agents. For example, I may use, together with a base substance, the alpha substituted allyl ester of acrylic or methacrylic acid and free acrylic or methacrylic acid which are polar compounds capable of serving as hardening agents.

The alpha substituted allyl esters of acrylic and methacrylic acids or other homologues may be also used as bonding agents for various granular materials and particularly for abrasive grains in the manufacture of grinding wheels and other abrasive products. In that case the proportion of the modifying agent employed will be governed by the requirement of the final product. If abrasive grains, such as crystalline alumina, silicon carbide, boron carbide or diamonds, are to be bonded by the interpolymer, the mixture of chosen monomeric substances may be incorporated with the grain in desired proportions and the bond polymerized by heat, with or without the aid of catalysts, such as benzoyl peroxide. Suitable procedure may be adopted for making such bonded articles in accordance with the methods set forth in the applications of Kistler and Barnes Serial No. 187,549 filed January 28, 1938, and Serial No. 228,004 filed September 1, 1938. For example, a grinding wheel may be made by placing a desired amount of the abrasive grains in a mold and then pouring into the mold a sufficient amount of the bond mixture to fill the interstices between the grains, after which the mold is subjected to heat for polymerizing the bond in place. Also, if the proportions of the base substance and modifying agent permit the substance to be softened by heat materially, then one may make the bond as a granular or powdered substance which may be mixed with the abrasive grains, together with a plasticizing medium, such as any suitable solvent which includes monomeric polymerizable liquids. Then the mixture of grains and bond may be shaped in a mold with sufficient heat and pressure to cause the bond to soften and adhere to the grains. The monomeric polymerizable plasticizer may be used in sufficient amount to wet the grains and be solidified by polymerization so that no liquid remains in the finished article. Other suitable procedures as set forth in my prior applications may be employed with the base substance and the modifying agent herein disclosed and this invention is deemed to cover the products thus made.

It will now be appreciated that one may make various shaped bodies for use in other industries, such as for electrical insulation, or for making molded articles of many uses. The monomeric liquid or liquids may be used in desired proportions and placed in a mold with or without catalysts and there subjected to heat or light to polymerize the mixture. If the copolymer is very hard it may be ground by standard grinding operations, such as are practiced in the industry for making an optical lens or other desired article. If the copolymer is fusible then it may be shaped under pressure within a suitable mold.

It will be understood that while I have attempted to explain this invention in the light of the present accepted theories yet the claims are not to be construed as dependent on any particular theory relative to the formation of these substances. Also, the examples above given are to be interpreted solely as illustrating the invention and not as limitations thereon, except as set forth in the claims appended hereto.

The alpha substituted allyl compounds above described and articles made therefrom are claimed in my copending divisional application Serial Number 308,642 filed on December 11, 1939.

I claim:

1. A composition of matter comprising an alkyl ester of methacrylic acid copolymerized with an alpha aryl substituted allyl methacrylate, in which the aryl substituent is a triphenyl phenyl group.

2. A copolymer of methyl methacrylate and alpha triphenyl phenyl substituted allyl methacrylate.

CARL E. BARNES.